US010734851B2

(12) United States Patent
Ando et al.

(10) Patent No.: US 10,734,851 B2
(45) Date of Patent: Aug. 4, 2020

(54) OUTER ROTOR TYPE BRUSHLESS MOTOR

(71) Applicant: MINEBEA CO., LTD., Kitasaku-gun, Nagano (JP)

(72) Inventors: Akio Ando, Yonago (JP); Hirotaka Sato, Oda (JP); Toshiyuki Nishikata, Yonago (JP)

(73) Assignee: MINEBEA MITSUMI INC., Nagano (JP)

( * ) Notice: Subject to any disclaimer, the term of this patent is extended or adjusted under 35 U.S.C. 154(b) by 96 days.

(21) Appl. No.: 15/914,310

(22) Filed: Mar. 7, 2018

(65) Prior Publication Data

US 2018/0198326 A1      Jul. 12, 2018

Related U.S. Application Data

(63) Continuation of application No. 14/479,580, filed on Sep. 8, 2014, now Pat. No. 9,948,151.

(30) Foreign Application Priority Data

Sep. 26, 2013  (JP) ................................ 2013-200494
Jun. 16, 2014  (JP) ................................ 2014-123010

(51) Int. Cl.
*H02K 1/14*          (2006.01)
*H02K 21/22*         (2006.01)
(Continued)

(52) U.S. Cl.
CPC ............. *H02K 1/146* (2013.01); *H02K 1/187* (2013.01); *H02K 21/222* (2013.01); *H02K 7/09* (2013.01); *H02K 21/22* (2013.01)

(58) Field of Classification Search
CPC ........ H02K 1/18; H02K 21/22; H02K 21/146; H02K 21/14; H02K 1/14; H02K 1/146; H02K 1/12; H02K 21/028; H02K 21/021
(Continued)

(56) References Cited

U.S. PATENT DOCUMENTS 4,712,035 A    12/1987  Forbes et al.
5,739,614 A     4/1998  Suzuki et al.
(Continued)

FOREIGN PATENT DOCUMENTS

EP       2209185 A2      7/2010
JP       H04-275053 A    9/1992
(Continued)

OTHER PUBLICATIONS

Apr. 5, 2017 Office Action Issued in U.S. Appl. No. 14/479,580.
(Continued)

*Primary Examiner* — Burton S Mullins
(74) *Attorney, Agent, or Firm* — Oliff PLC

(57) ABSTRACT

A motor includes a rotor frame; a shaft; first and second rotor magnets that are coupled with the shaft, formed separately, and spaced apart in an axial direction of the shaft; a stator portion having a stator core, a winding around the stator core, and a plurality of first salient pole portions; a torque holding portion facing the rotor magnets in a radial direction, being arranged between the rotor frame and the stator portion in the axial direction of the shaft, and having a plurality of second salient pole portions; and a circuit board arranged, in the axial direction of the shaft, on a side of the stator portion opposite the rotor frame. An electronic component is arranged at the circuit board.

9 Claims, 9 Drawing Sheets

(51) Int. Cl.
*H02K 1/18* (2006.01)
*H02K 7/09* (2006.01)

(58) Field of Classification Search
USPC ............ 310/51, 156.04, 156.05, 156.38, 257
See application file for complete search history.

(56) References Cited

U.S. PATENT DOCUMENTS

| | | | |
|---|---|---|---|
| 6,097,129 | A | 8/2000 | Furtwangler et al. |
| 6,291,916 | B1 | 9/2001 | Huang et al. |
| 6,337,526 | B1 | 1/2002 | Lin et al. |
| 6,384,505 | B1 | 5/2002 | Horng et al. |
| 6,483,209 | B1 | 11/2002 | Horng et al. |
| 6,954,011 | B2 | 10/2005 | Horng et al. |
| 6,977,453 | B2 | 12/2005 | Yoda et al. |
| 7,064,465 | B2 | 6/2006 | Huang et al. |
| 7,224,095 | B2 | 5/2007 | Chen |
| 9,035,504 | B2 | 5/2015 | Furrer et al. |
| 9,948,151 | B2 * | 4/2018 | Ando ................ H02K 1/146 |
| 2006/0232149 | A1 | 10/2006 | Horng et al. |
| 2012/0267976 | A1 | 10/2012 | Furrer et al. |

FOREIGN PATENT DOCUMENTS

| | | |
|---|---|---|
| JP | H07-067311 A | 3/1995 |
| JP | H10-341590 A | 12/1998 |
| JP | 2005-295736 A | 10/2005 |
| JP | 2007-143289 A | 6/2007 |
| JP | 2011-231812 A | 11/2011 |

OTHER PUBLICATIONS

Jul. 24, 2017 Office Action issued in Japanese Application No. 2014-123010.
Aug. 21, 2017 Office Action Issued in U.S. Appl. No. 14/479,580.
Oct. 13, 2017 Preissuance Submissions by Third Parties filed in Japanese Patent Application No. 2014-123010.
Oct. 8, 2019 Office Action issued in Japanese Patent Application No. 2018-220494.

* cited by examiner

OUTER ROTOR TYPE BRUSHLESS MOTOR

This application is a continuation application of U.S. patent application Ser. No. 14/479,580, filed Sep. 4, 2014, the disclosure of which is hereby incorporated by reference in its entirety.

TECHNICAL FIELD

The present invention is related to an outer rotor type brushless motor.

BACKGROUND ART

In a state that a motor is not exited, a characteristic that a rotor is going to maintain a constant position is called a detent torque (holding torque). For example, in the case of a motor for driving and controlling a louver of an air-conditioning equipment, opening and closing control and the like are performed by the motor, but in some usage, the louver may be moved to an open position or the like, and in that state, the motor is stopped and the louver position is held at the open position.

In such a case, if the holding torque of the motor is small, a trouble occurs that the rotor moves for the self-weight of the louver and the louver cannot be held at the open position. Thus, when it is desired to continue to hold a position of the rotor under an environment in which external force is easily applied to the rotor, a high holding torque is required for the motor.

In Patent Literature 1 (Japanese Laid-open Patent Application Publication No. 2007-143289), it is disclosed that by combining three types of pole teeth having different areas obtained by varying the height and the width of the pole teeth provided in the stator yoke assembly, the design of the outer rotor type motor of high holding torque is possible.

However, since the stator core is a member for controlling the rotation of the motor, the structure should be such that the electrical characteristics capable of performing an appropriate rotation control can be obtained. In the method for obtaining a holding torque using the stator core as in the conventional method, there is a problem that it is difficult to obtain the optimum holding torque, due to the structural constraints for ensuring the optimum rotation control. Further, the structural constraints also makes it difficult to finely set the holding torque value.

CITATION LIST

Patent Literature

Patent Literature 1: Japanese Laid-open Patent Application Publication No. 2007-143289

SUMMARY OF INVENTION

Technical Problem

The present invention has been made in view of the above circumstances, and the object is to provide an outer rotor type brushless motor having a high flexibility in setting the value of the holding torque, and capable of realizing the optimum holding torque.

Solution to Problem

In order to achieve this object, the present invention can be understood by the following structures.

(1) An outer rotor type brushless motor according to the present invention comprises: a rotor portion having a rotor frame, a shaft provided at the center of the rotor frame, and a rotor magnet provided on the outer circumference of the rotor frame; a bearing housing rotatably supporting the shaft; a stator portion provided so as to face the rotor magnet on an inner side of the outer circumference portion of the rotor frame and an outer circumference of the bearing housing, and having a stator core, a plurality of first salient pole portions extending toward the rotor magnet from the stator core, an insulation disposed so as to surround the first salient pole portion, and a winding wound around the first salient pole portion through the insulation; and a torque holding portion provided so as to be separated from stator portion and to face the rotor magnet on an inner side of the outer circumference portion of the rotor frame and an outer circumference of the bearing housing, and having a plurality of second salient pole portions disposed coaxially with the stator core and extending toward the rotor magnet, where the first salient pole portions and the second salient pole portions are provided in different numbers.

(2) In the configuration of the above (1), the rotor magnet has poles of an integral multiple of the number of the portions of the second salient pole portion.

(3) In the configuration of the above (1), the second salient pole portion has a winding wound around.

(4) In the configuration of the above (1), the second salient pole portion has a tip portion bent so as to conform to the rotor magnet in a side view.

(5) In the configuration of the above (1), the rotor magnet is formed separately from a first rotor magnet facing the first salient pole portion, and a second rotor magnet facing the second salient pole portion.

(6) In the configuration of the above (1), the stator portion and the torque holding portion are formed with different materials.

(7) In the configuration of the above (5), the first rotor magnet and the second rotor magnet are formed with different materials.

(8) In the configuration of the above (1), the second salient pole portion has a tip portion bent so as to conform to the rotor magnet in a side view, and the rotor magnet is formed separately from a first rotor magnet facing the first salient pole portion, and a second rotor magnet facing the second salient pole portion.

Advantageous Effects of Invention

According to the present invention, an outer rotor type brushless motor having a high flexibility in setting the value of the holding torque, and capable of realizing the optimum holding torque can be provided.

DESCRIPTION OF EMBODIMENTS

Hereinafter, an embodiment for carrying out the present invention (hereinafter, referred to as "embodiment") shall be described with reference to the accompanying drawings. Throughout the description of the embodiments, the same number is given to the same element.

(Overall Structure of Outer Rotor Type Brushless Motor)

Figure 1:
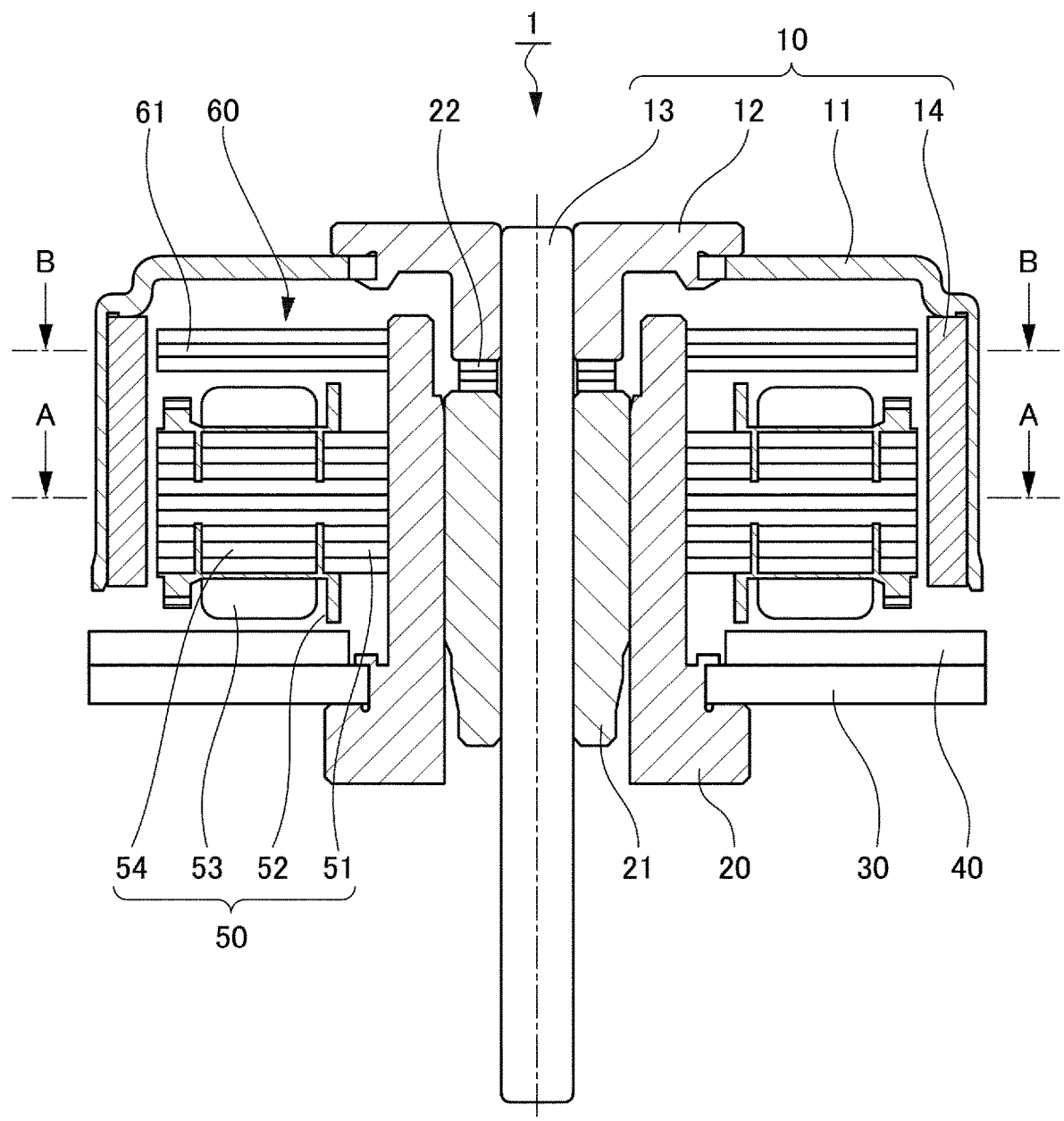
FIG. 1 is a cross-sectional view of an outer rotor type brushless motor of the present invention.

FIG. 1 is a cross-sectional view of an outer rotor type brushless motor of the present invention. An outer rotor type brushless motor 1 of the present invention is configured mainly with a rotor portion 10, a bearing housing 20, a stator portion 50, a torque holding portion 60, a base board 30 and a circuit board 40.

(Rotor Portion)

The rotor portion 10 is configured with a rotor frame 11 having an opening in the center portion of the cup shape, a rotor boss 12 fixed to the opening, a shaft 13 fixed to the rotor boss 12 and forming a rotation axis, and a rotor magnet 14 attached to the inner side of the outer circumference portion of the rotor frame 11 and having a cylindrical shape. Here, in FIG. 1, there is shown a case of fixing the shaft 13 through the rotor boss 12 which is a component different from the rotor frame 11, but another case is possible where the structure of fixing the shaft 13 to the rotor frame 11 is formed integrally and the shaft 13 is fixed directly to the rotor frame 11.

(Bearing Housing)

The bearing housing 20 has a bearing structure 21 in the center of the bearing housing 20, and supports the shaft 13 rotatably. Here, in FIG. 1, there is shown the bearing structure 21 and the bearing housing 20 are different components, but another case is possible where the bearing structure 21 is formed integrally, directly inside the bearing housing 20.

Further, a washer 22 for receiving a thrust load (axial direction load) is provided between the upper end of the bearing housing 20 and the lower end of the rotor boss 12. The washer 22 is a component being interposed for reducing the rotational resistance that occurs between the rotor boss 12 and the bearing housing 20 during rotation of the rotor portion 10. Note that the washer 22 is sometimes called a thrust bearing or a ball bearing.

(Stator Portion)

The stator portion 50 is configured with a stator core 51, an insulation (for example, insulator) 52, and a winding (coil) 53. The stator core 51, as illustrated in FIG. 1, has a structure of being stacked with a plurality of electromagnetic steel plates, and is fixed to the outer circumference of the bearing housing 20 by press-fitting or the like. Further, the stator core 51 is a structure of having a plurality of first salient pole portions 54 (refer to FIG. 2), and the coil 53 is wound around each of the first salient pole portions 54 and the insulation 52. Additionally, the stator core 51 shall be described in detail later.

(Torque Holding Portion)

The torque holding portion 60 illustrated in FIG. 1 has a structure of being stacked with a plurality of electromagnetic steel plates, and is fixed on an outer circumference of the bearing housing 20 at a position spaced coaxially with the stator portion 50, by press-fitting or the like. Note that the torque holding portion 60 may be composed of a magnetic material, and may not need to be a laminated structure. In other words, it may be a one piece plate or the like. Further, as described in detail later, the torque holding portion 60 has a structure of having a plurality of second salient pole portions 61 (refer to FIG. 3).

(Base Board and Circuit Board)

In the example illustrated in FIG. 1, a base board 30 made of a material such as iron or aluminum is attached to the lower portion of the bearing housing 20, and on the base board 30, a circuit board 40 equipped with electronic components such as an IC and a Hall element for controlling the electric current and the like which is supplied to the coil 53 for exciting the first salient pole portion 54 of the stator core 51 is attached. And, the ends of the coil 53 are electrically connected to the circuit board 40 by a solder or the like.

First Embodiment

Hereinafter, with reference to FIG. 2 and FIG. 3, a first embodiment of the present invention shall be described. At first, referring to FIG. 2, a structure of a motor portion (a rotor portion 10 and a stator portion 50) shall be described and then, referring to FIG. 3 a structure for increasing holding torque (a rotor portion 10 and a torque holding portion 60) shall be described.

(Structure of Motor Portion)

Figure 2:
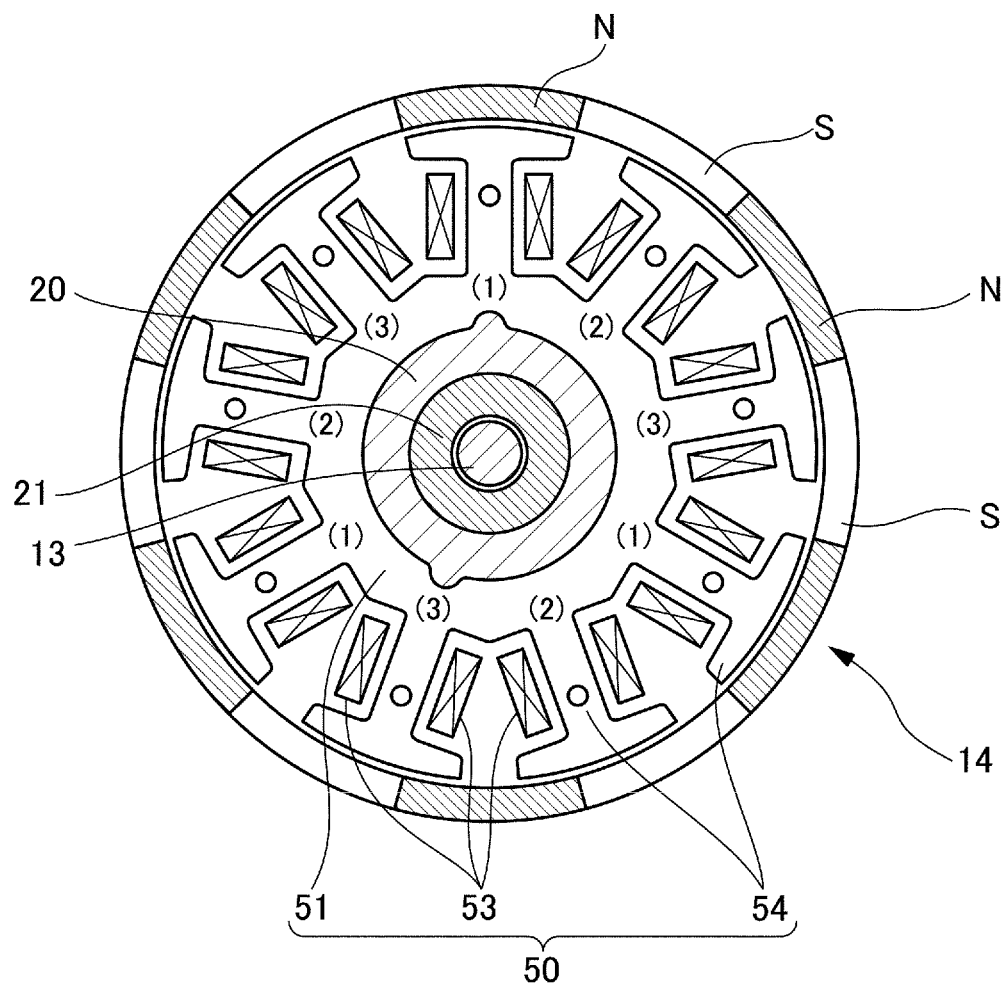
FIG. 2 is a cross-sectional view taken along line A-A of FIG. 1.

FIG. 2 is a cross-sectional view taken along line A-A of FIG. 1. In the example illustrated in FIG. 2, a number of magnetic poles of the rotor magnet 14 is 12 (12 poles), and a number of the first salient pole portion 54 of the stator core 51 is 9 (9 slots). In FIG. 2, illustration of the outer circumference portion of the rotor frame 11 is omitted.

As illustrated in FIG. 2, the rotor magnet 14 has a cylindrical shape, and the S poles and the N poles are arranged alternately at substantially equal intervals in the circumference direction. In addition, the stator core 51 is also provided with first salient pole portions 54 at equal intervals in the circumference direction, and No. (1), (2) and (3) portions of the first salient pole portions 54 are arranged to be repeated sequentially.

Then, the motor drive is achieved by supplying a current to a coil 53 being wound around the first salient pole portion 54, and exciting the first salient pole portion 54. In one example of the motor drive, for example, when the No. (2) three portions of the first salient pole portions 54 are excited to the S pole, the N pole of the rotor magnet 14 close to the No. (2) portions of first salient pole portions 54 are attracted to the No. (2) portions of the first salient pole portions 54. Therefore, the rotor portion 10 will move in the direction rotating counterclockwise. By this rotation, the No. (2) portions of the first salient pole portions 54 change to a state where only the N pole of the rotor magnet 14 faces, as the No. (1) portions of the first salient pole portions 54 in FIG. 2.

Thus, when the first salient pole portion 54 has a positional relationship with the rotor magnet 14 where the No (2) portions of the first salient pole portions 54 face only the N poles of the rotor magnet 14, the No. (3) portions of the first salient pole portions 54 have the similar positional relationship with the magnetic poles of the rotor magnet 14 as the positional relationship between the No. (2) portions of the first salient pole portions 54 and the magnetic poles of the rotor magnet 14. In this state, hereinafter, when the No. (3) portions of the first salient pole portions 54 are excited to the S pole, the same operation as described in the No. (2) portions of the first salient pole portions 54 occurs at the No. (3) portions of the first salient pole portions 54, and so the rotor portion 10 moves in the direction rotating counterclockwise further.

In other words, when the first salient pole portions 54 are excited to the S pole sequentially in the clockwise direction like (2)→(3)→(1)→(2)→ . . . , a motor drive to rotate counterclockwise is realized. Note that in the above description, for easy understanding of the state of the motor drive, the explanation is made where the No's. (2), (3), (1) are excited sequentially. However, the method of the excitation for realizing the motor drive is not limited to the above description.

For example, at about the same time when the No. (2) portions of the first salient pole portions 54 are excited to the S pole, the No. (3) portions of the first salient pole portions 54 may be excited to the N pole. In this case, the No. (2) portions of the first salient pole portions 54 are going to attract the N poles of the rotor magnet 14, and the No. (3) portions of the first salient pole portions 54 are going to attract the S poles of the rotor magnet 14. Each of the attracting forces, as can be seen in FIG. 2, act to rotate the rotor portion 10 counterclockwise. Therefore, even if the excitation is carried out in this way, the rotor portion 10 rotates in the counterclockwise direction.

By this rotation, when the No. (2) portions of the first salient pole portions 54 are in the state of facing only the N poles of the rotor magnet 14 as the No. (1) portions of the first salient pole portions 54 in FIG. 2, the No. (3), (1) portions of the first salient pole portions 54 are in the same state as the positional relationship between the No. (2), (3) portions of the first salient pole portions 54 and the magnetic poles of the rotor magnet 14. Therefore, this time, when the No. (3), (1) portions of the first salient pole portions 54 are excited to the S pole, the N pole respectively, the rotor portion 10 rotates in the counterclockwise direction further. By repeating such an excitation, the rotor portion 10 also rotates in the counterclockwise direction.

In addition, when the plural number portions of the first salient pole portion 54 are excited almost at the same time as the above described example, the power consumption increases, but the rotational torque of the motor grows larger since the attractive force increases.

On the other hand, if it is intended to rotate the rotor portion 10 in the clockwise direction, contrary to the above, the first salient pole portions 54 may be excited in the counterclockwise direction. Specifically, in the state of FIG. 2, when the first salient pole portions 54 are excited to the S pole sequentially in the counterclockwise direction like (3)→(2)→(1)→(3)→ . . . , the rotor portion 10 rotates in the clockwise direction.

Further, in the case of a motor drive where the rotor portion 10 is rotates in the clockwise direction, in the same way as described above, the multiple number portions of the first salient pole portions 54 may be excited almost at the same time. For example, in the state of FIG. 2, when the No. (3), (2) portions of the first salient pole portions 54 are excited to the S pole, the N pole respectively, the rotor portion 10 rotates in the clockwise direction.

In this way, with regard to which number portions of the first salient pole portions 54 are excited at what timing, an appropriate control may be chosen depending on the demands (power consumption, rotation torque, rotation direction) required to the rotor portion 10.

(Structure for Increasing Holding Torque)

Hereinafter, with reference to FIG. 3, a torque holding portion 60 as a structure for increasing the holding torque shall be described. FIG. 3 is a cross-sectional view taken along line B-B of FIG. 1. Here, in FIG. 3, illustration of the outer circumference portion of the rotor frame 11 is omitted. As illustrated in FIG. 1, the rotor magnet 14 is disposed to the position where the torque holding portion 60 exists.

Figure 3:
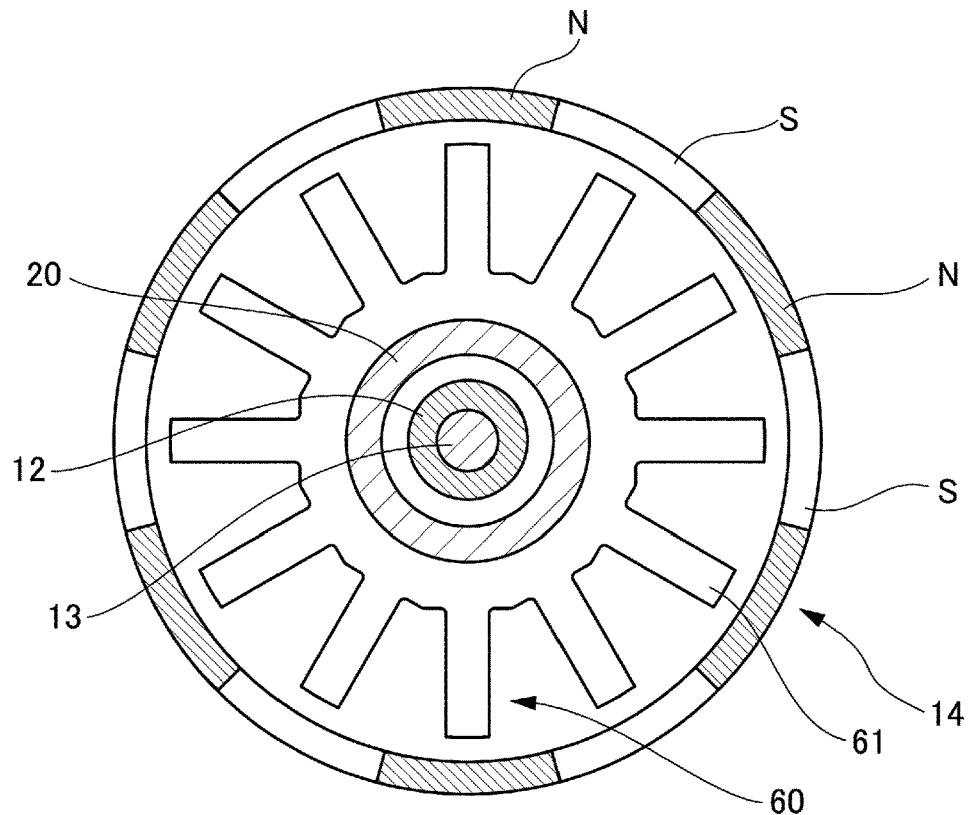
FIG. 3 is a cross-sectional view taken along line B-B of FIG. 1 and is a diagram illustrating a torque holding portion of the first embodiment.

As illustrated in FIG. 3, in the torque holding portion 60, 12 portions which is the same number as the magnetic pole number (12 poles) of the rotor magnet 14, of the second salient pole portions 61 are provided at substantially equal intervals in the circumferential direction. Each of the second salient pole portions 61 are disposed so as to extend facing the corresponding magnetic pole of the rotor magnet. Further, the second salient pole portions 61 are formed substantially in the same width up to the base end portion from the tip facing the rotor magnet 14, and the base end portions of the second salient pole portions 61 are connected.

Here, as described above, the torque holding portion 60 is a magnetic body since it is composed of a material being laminated with electromagnetic steel plates. Therefore, each of the second salient pole portions 61 of the torque holding portion 60 and the each of the poles of the rotor magnet 14 facing thereto attract mutually (hereinafter, referred to as "attractive force"). By this attractive force, the holding torque is increased.

In addition, in the above described example, when attention is paid to one portion of the second salient pole portions 61, there exists another one portion of the second salient pole portions 61 at just the position in the reverse side of the shaft 13 as a standard (that is, the position being rotated by 180 degrees). And, when the state of the magnetic poles which faces the pair of portions of the second salient pole portions 61 respectively is viewed, both are set to be the same state. In other words, in the pair of the portions of the second salient pole portions 61, when one portion of the second salient pole portions 61 faces the N pole of the magnetic poles of the rotor magnet 14, the other portion also faces the N pole of the magnetic poles, and further, when one portion of the second salient pole portions 61 faces the border line between the N pole and the S pole, the other portion also faces the border line between the N pole and the S pole of the second salient pole portions 61.

Here, assuming that the attractive force exerted to either of the pair of the portions of the second salient pole portions 61 is larger than the other, the portion of the second salient pole portions 61 to which the larger attractive force is exerted, is attracted more strongly to the side of the rotor magnet 14, than the other portion of the second salient pole portions 61 to which the smaller attractive force is exerted. This force acts to the portion between the shaft 13 being connected to the rotor magnet 14 with the rotor frame 11 and the bearing housing 20 securing the torque holding portion 60, and shifts the shaft 13 from the rotation center (decenter).

On the other hand, in the above described example, as described above, the pair of the portions of the second salient pole portions 61 have the same attractive force, since the states of the rotor magnet 14 facing each of the pair of the portions are the same. Therefore, decentering of the shaft 13 can be avoided. Further, even when viewed in the circumference direction, uniformly in substantially equal intervals, the attractive force generates uniformly in substantially equal intervals. Therefore, when the motor rotates, a problem such that the rotation axis is shifted and the decentered rotation state is generated does not occur. Further, in the stopped state of the motor, the holding torque which is stable in the circumference direction can be obtained.

Here, when attention is paid to the structure of the present invention, the torque holding portion 60 and the stator core 51 are realized by different structures. Therefore, the function required as the stator core 51 is realized by the structure of the stator core 51, and the optimum design of the torque holding portion 60 for obtaining necessary holding torque is possible, without receiving the structural constraint for performing the function required as the stator core 51. As a result, in the outer rotor type brushless motor 1 having the torque holding portion 60 according to the present invention, the optimum holding torque can be realized. Further, due to the absence of the structural constraint for the optimum design, it is also possible to set the holding torque value finely if necessary.

Further, when attention is paid to the overall structure of the motor, to a basic structure of a general outer rotor type brushless motor, only the component for increasing the holding torque (the torque holding portion 60 having the second salient pole portion 61) is added, and the added component (the torque holding portion 60) also is a component having a shape close to the shape of a general stator core. Therefore, the unit price of the component can be suppressed to a low value, by diverting the production line of the stator core.

Further, viewing the specific structures of the rotor magnet 14, the stator core 51 and the torque holding portion 60, while the number of the magnetic poles of the rotor magnet 14 is 12, the stator core 51 has 9 portions of the first salient pole portions 54 for realizing the above described motor drive. On the other hand, the torque holding portion 60 has 12 portions of the second salient pole portions 61 which number is the same as the number of the magnetic poles of the rotor magnet 14 and therefore, the first salient pole portion 54 and the second salient pole portion 61 are formed in different numbers.

Second Embodiment

Figure 4:
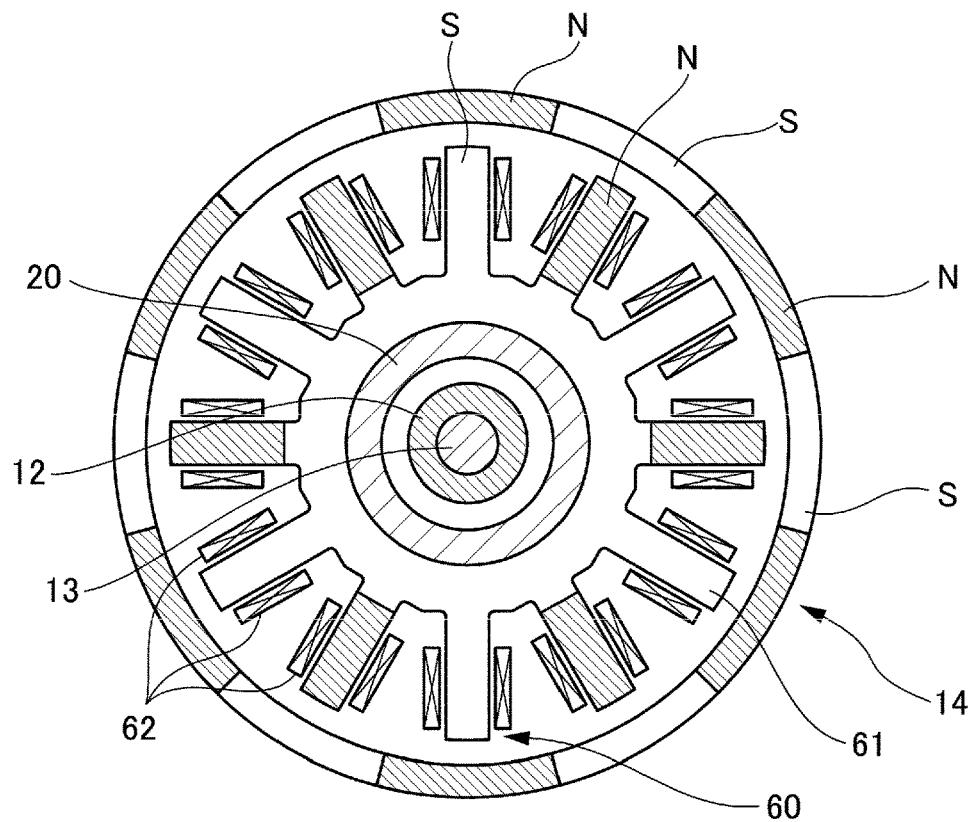
FIG. 4 is a cross-sectional view taken along line B-B of FIG. 1 and is a diagram illustrating a torque holding portion of the second embodiment.

With reference to FIG. 4, a second embodiment of the present invention shall be described. FIG. 4 is a cross-sectional view taken along line B-B of FIG. 1, and illustration of the rotor frame 11 is omitted. The second embodiment of the present invention has the same basic structure as the structure of the first embodiment.

The point which differs from the first embodiment is that the coil 62 is provided by winding around the second salient pole portion 61 of the torque holding portion 60. In this case, the winding method of the coil 62 is preferred such that the forward winding and the reverse winding are repeated sequentially. In other words, the winding direction of the coil 62 is reversed each other in the adjacent portions of the second salient pole portion 61. In that state, when a current is supplied to the coil 62, as illustrated in FIG. 4, the second salient pole portions 61 are excited so as to be the N pole and the S pole alternately.

Therefore, when a current is supplied to the coil 62 and the second salient pole portions 61 are excited, as illustrated in FIG. 4, the rotor portion 10 stops in the state where the S pole, the N pole of the second salient pole portions 61 are attracted to the N pole, the S pole of the rotor magnet 14 respectively, and so it is possible to improve the stopping torque.

Third Embodiment

Figure 5:
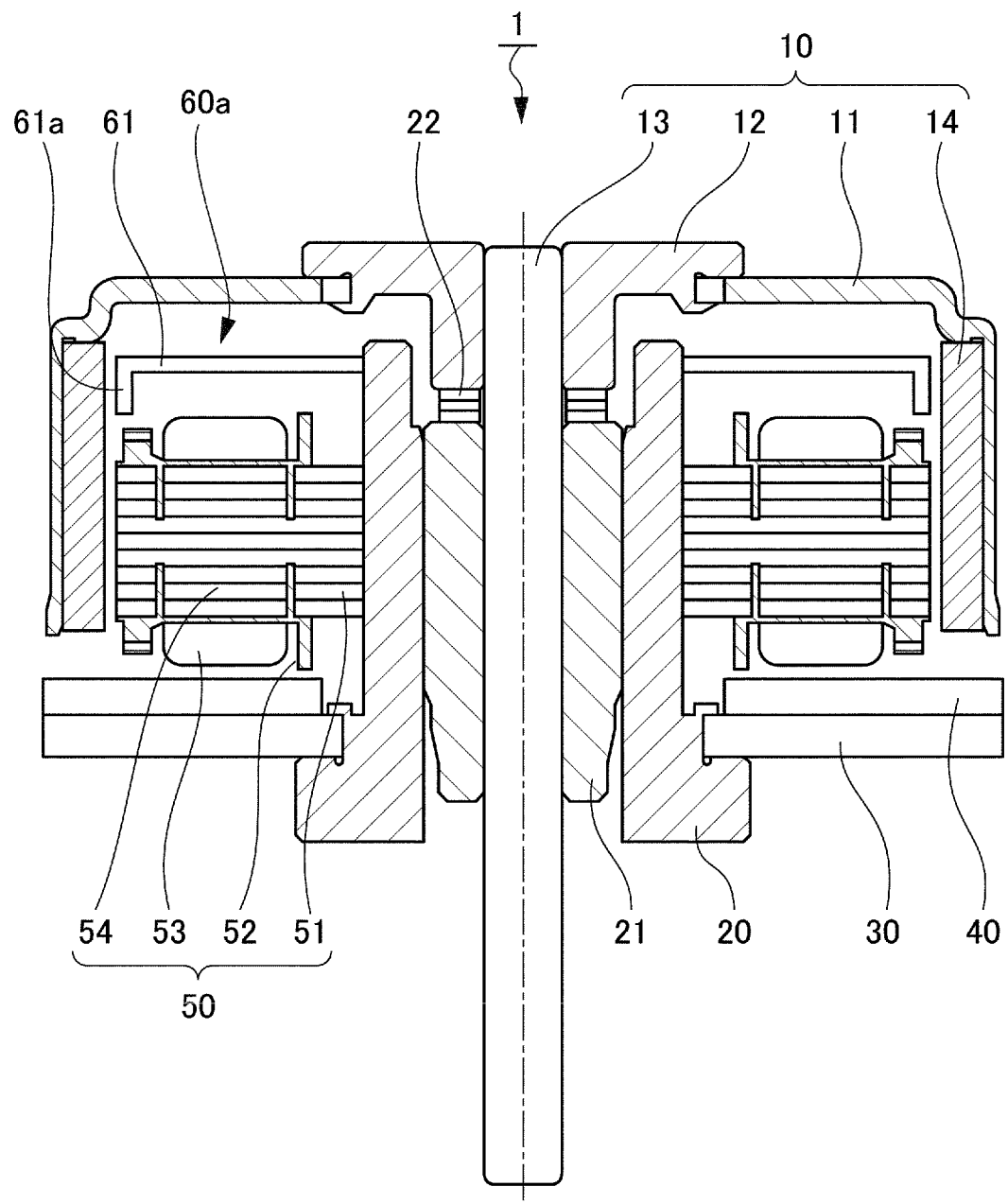
FIG. 5 is a cross-sectional view of an outer rotor type brushless motor of the third embodiment.
Figure 6:
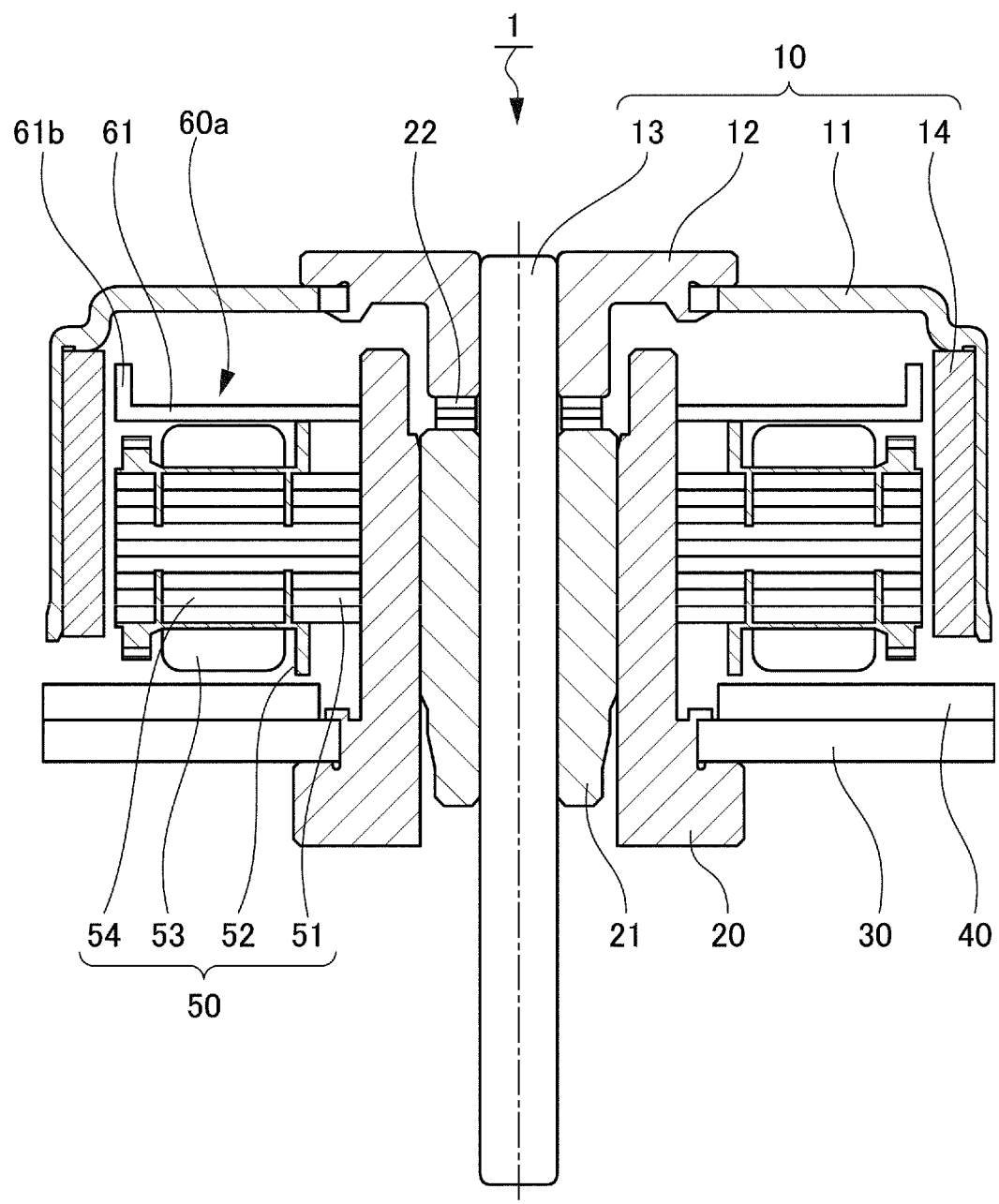
FIG. 6 is a cross-sectional view of an outer rotor type brushless motor of the third embodiment.

With reference to FIG. 5 and FIG. 6, a third embodiment of the present invention shall be described. FIG. 5 is a cross-sectional view of the outer rotor type brushless motor 1 of the third embodiment. The points which differ from the first embodiment are that a torque holding portion 60a is not a laminate of electromagnetic steel plates, but is composed of one plate consisting of a magnetic material, and a tip portion 61a of the second salient pole portion 61 facing the rotor magnet 14 is bent so as to conform to the rotor magnet 14 in the side view.

In addition, the relationship between the magnetic poles of the rotor magnet 14 and the second salient pole portions 61 is the same as the relationship in the first embodiment illustrated in FIG. 3. In other words, the number of the magnetic poles of the rotor magnet 14 is 12, and 12 portions of the second salient pole portions 61 of the torque holding portion 60a are formed at equal intervals in the circumference direction. Further, it is not illustrated, but the second salient pole portions 61 are also formed substantially in the same width up to the base end portion from the tip facing the rotor magnet 14 in the present embodiment in the same manner as in the first embodiment.

In this way, since the tip portions 61a of the second salient pole portions 61 facing the rotor magnet 14 is bent so as to conform to the rotor magnet 14 though the torque holding portion 60a is formed in one piece plate shape, regardless of the thickness of the plate, the area for receiving the magnetic force of rotor magnet 14 can be increased.

In addition, since the process for laminating the electromagnetic plates is unnecessary which is practiced in the first embodiment for forming the torque holding portion 60a, it becomes possible to reduce the manufacturing cost of the torque holding portion. Though in FIG. 5, the tip portion 61a of the second salient pole portion 61 facing the rotor magnet 14 is bent toward the side of the stator portion 50, but this bending direction is not limited in particular, and a structure of a tip portion 61b being bent toward the reverse side of the stator portion 50 as illustrated in FIG. 6 is possible. Further, as illustrated in FIG. 6, the torque holding portion 60a may be disposed so as to contact the insulator 52 of the stator portion 50.

Fourth Embodiment

Figure 7:
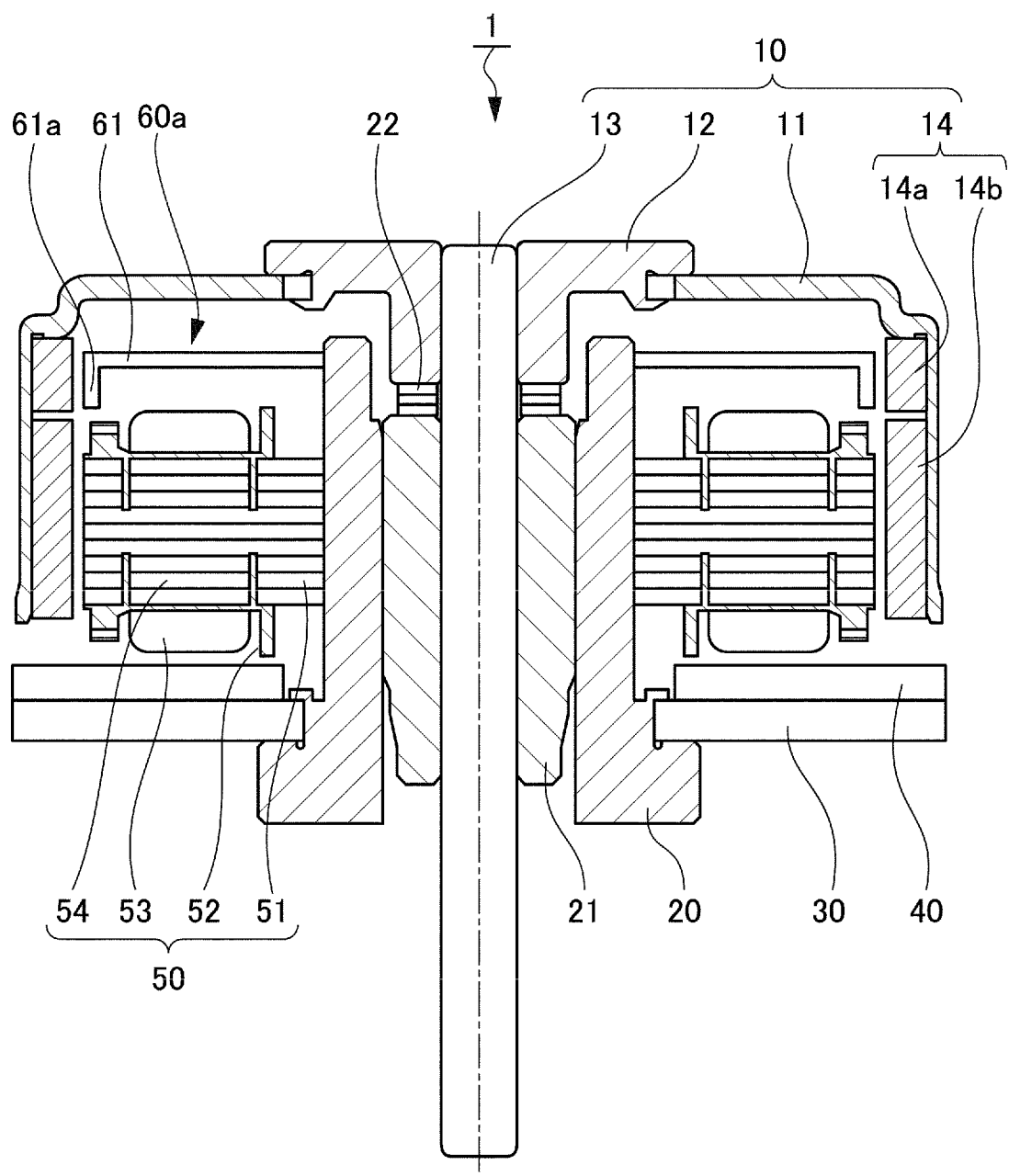
FIG. 7 is a cross-sectional view of an outer rotor type brushless motor of the fourth embodiment.
Figure 8:
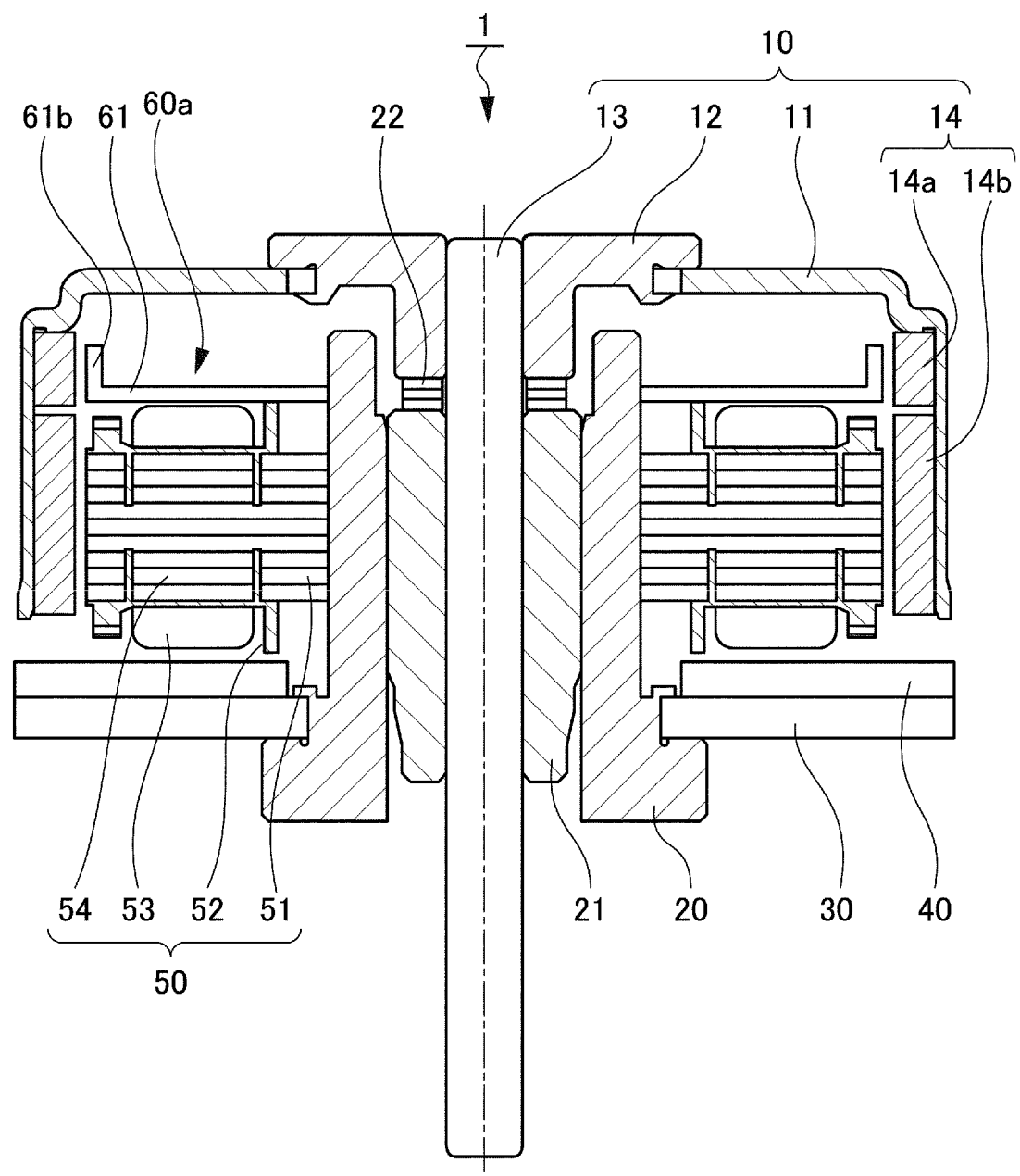
FIG. 8 is a cross-sectional view of an outer rotor type brushless motor of the fourth embodiment.

With reference to FIG. 7 and FIG. 8, a fourth embodiment of the present invention shall be described. FIG. 7 is a cross-sectional view of the outer rotor type brushless motor 1 of the fourth embodiment. In the outer rotor type brushless motor 1 illustrated in FIG. 7, as compared to that of the third embodiment illustrated in FIG. 5, there is a different point that a portion (first rotor magnet) 14b of the rotor magnet 14 facing the first salient pole portion 54 of the stator portion 50 and a portion (second rotor magnet) 14a of the rotor magnet 14 facing the tip portion 61a of the second salient pole portion 61 are formed separately, and the other points are the same as the structure of the third embodiment illustrated in FIG. 5.

In this way, by configuring the rotor magnet 14 in separate basis, it becomes possible to design the portion (second rotor magnet) 14a facing the tip portion 61a of the second salient pole portion 61 and the portion (first rotor magnet) 14b facing the first salient pole portion of the stator portion 50 separately, and the degree of freedom in setting the holding torque value can be increased further, and it is possible to realize the optimum holding torque. Further, as illustrated in FIG. 8, also in the structure having the tip portion 61b in which the tip portion of the second salient pole portion 61 is bent toward the reverse side of the stator portion 50, the rotor magnet 14 may be formed separately in the same manner.

(Number of Magnetic Poles of Rotor Magnet and Number of Portions of Second Salient Pole Portions 61)

In all the embodiments from the first embodiment to the fourth embodiment, the number of portions of the second salient pole portions 61 of the torque holding portion 60, 60a is set to 12 which is the same number as the number of the magnetic poles (12 poles) of the rotor magnet. However, the number of the portions of the second salient pole portions 61 does not necessarily need to be the same as the number of the magnetic poles of the rotor magnet 14. Next, description shall be made on the number of the magnetic poles of the rotor magnet and the number of the portions of the second salient pole portions 61. Here, in the followings, description shall be made in comparison with the torque holding portion 60 illustrated in the first embodiment, but the situation is the same also in the second embodiment, the third embodiment and the fourth embodiment.

Hereinafter, with reference to FIG. 9 to FIG. 12, description shall be made illustrating a specific example that even when the number of the portions of the second salient pole portions 61 of the torque holding portion 60 is different from the number of the magnetic poles of the rotor magnet 14 (12 poles), the same effect as the effect in the first embodiment can be obtained. In addition, each of FIG. 9 to FIG. 12 illustrates a cross-sectional view taken along line B-B of FIG. 1, and illustration of the rotor frame 11 is omitted.

In the same manner as the first embodiment, in order that the shaft 13 does not decenter, when attention is paid to one portion of the second salient pole portions 61, a pair of portions of the second salient pole portions 61 may be provided, so that one portion of the second salient pole portions 61 exists at just the position in the reverse side of the shaft 13 as a standard (that is, the position being rotated by 180 degrees). Further, in order to obtain a stable holding torque in the circumference direction, the portions of the second salient pole portions 61 may be disposed uniformly in substantially equal intervals when viewed in the circumference direction. Note that hereinafter, such a state is referred to as "an arrangement similar to the first embodiment".

Thus, when the state of the arrangement of the portions of the second salient pole portions 61 illustrated in FIG. 9 to FIG. 12, it is quite obvious that the arrangement becomes "an arrangement similar to the first embodiment". Hereinafter, the arrangement of the portions of the second salient pole portions 61 illustrated in FIG. 9 to FIG. 12 shall be described further.

Figure 9:
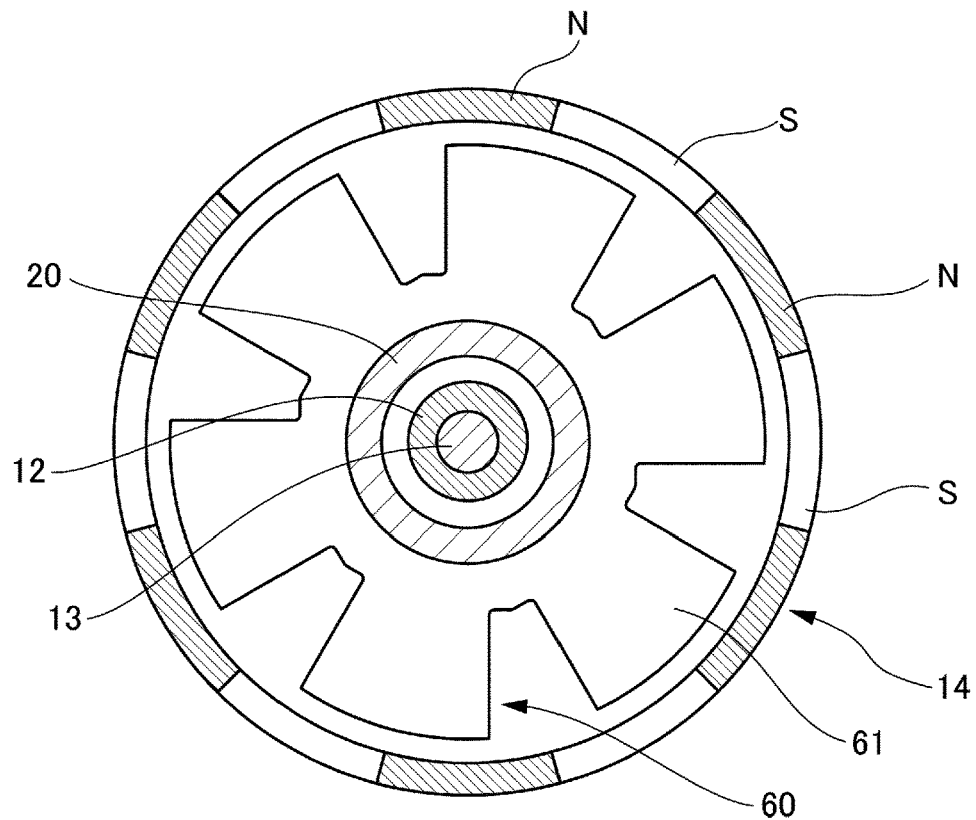
FIG. 9 is a cross-sectional view taken along line B-B of FIG. 1 and is a diagram illustrating a number of a second salient pole portion of a torque holding portion.

FIG. 9 illustrates a case where with regard to the state of FIG. 3 (the first embodiment) as a standard, a change is made so that the adjacent portions of the second salient pole portions 61 become one portion of the second salient pole portions 61. At this time, the rotor magnet 14 has 12 magnetic poles which number is the double of the number of the portions of the second salient pole portions 61 (6 portions).

Figure 10:
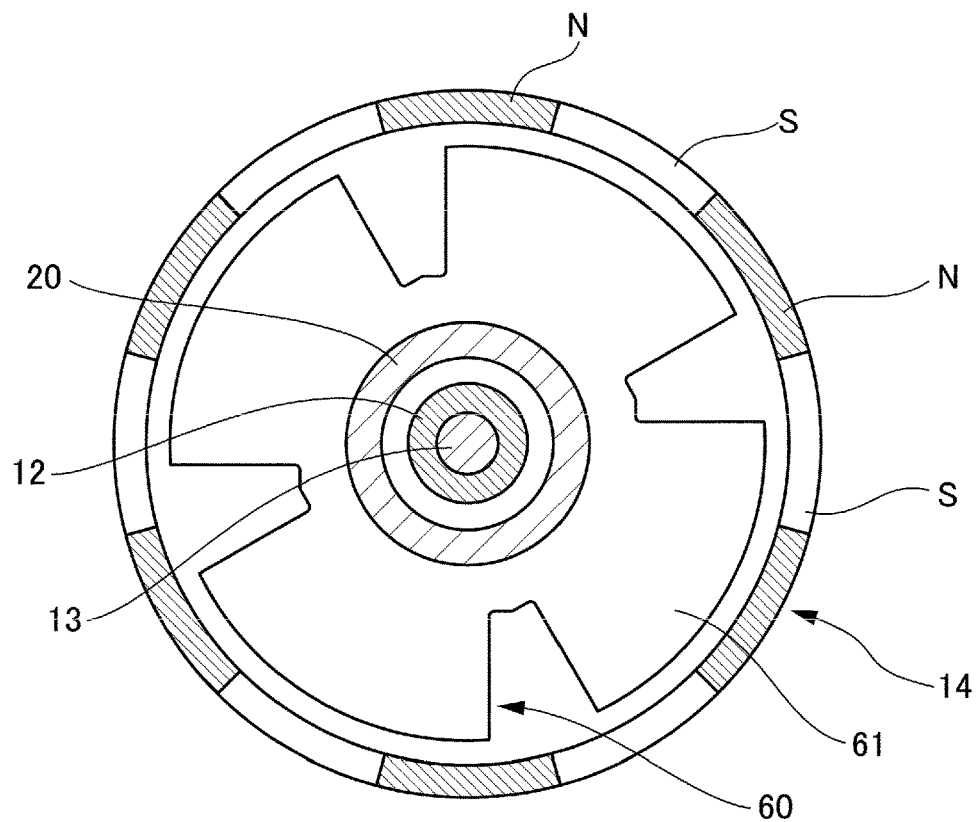
FIG. 10 is a cross-sectional view taken along line B-B of FIG. 1 and is a diagram illustrating a number of a second salient pole portion of a torque holding portion.

Further, FIG. 10 illustrates a case where with regard to the state of FIG. 3 (the first embodiment) as a standard, a change is made so that the adjacent 3 portions of the second salient pole portions 61 become one portion of the second salient pole portions 61. At this time, the rotor magnet 14 has 12 poles of the magnetic poles which number is three times the number of the portions of the second salient pole portions 61 (4 portions). As described above, the structures of FIG. 9 and FIG. 10 are realized by grouping some portions of the second salient pole portions 61 to one portion of the second salient pole portions 61, so that the torque holding portion 60 becomes to have "an arrangement similar to the first embodiment" described above, with regard to a case where the torque holding portion 60 has the same number of the portions of the second salient pole portions 61 as the number of the magnetic poles of the rotor magnet (12 poles) as a standard.

In this case, the rotor magnet 14 has the magnetic poles which number is equal to the integral multiple of the number of the portions of the second salient pole portions 61.

Figure 11:
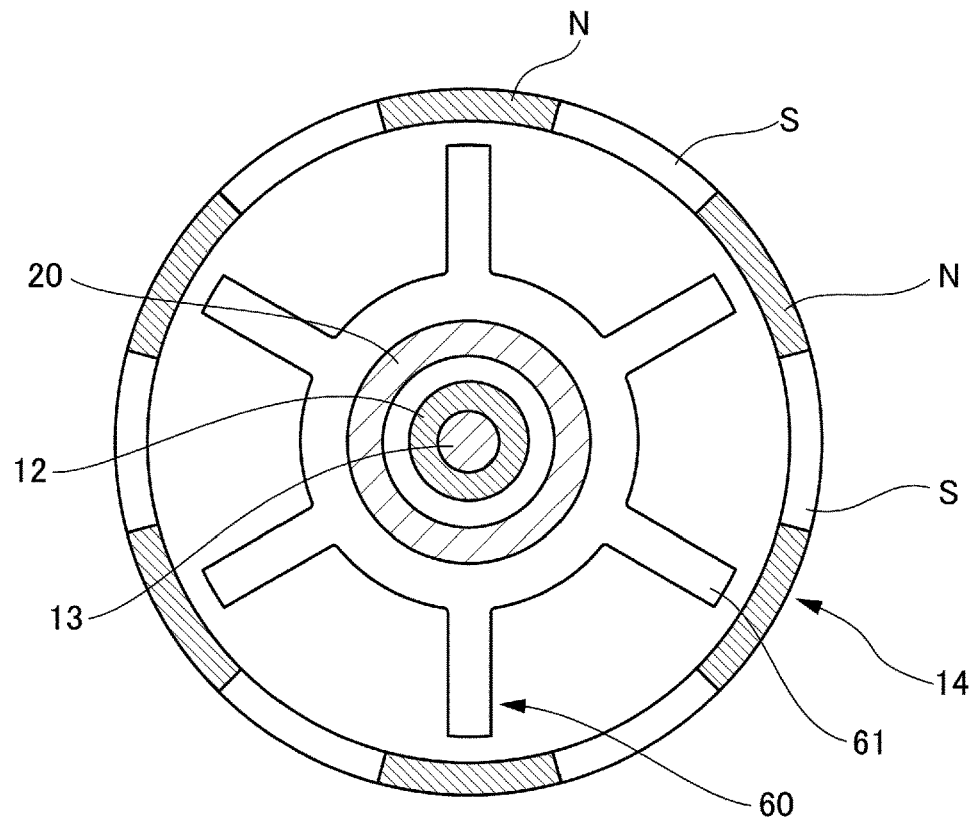
FIG. 11 is a cross-sectional view taken along line B-B of FIG. 1 and is a diagram illustrating a number of a second salient pole portion of a torque holding portion.

On the other hand, FIG. 11 illustrates a case where it is changed so as to remove one of the adjacent two portions of the second salient pole portions 61 with regard to the state of FIG. 3 (the first embodiment) as a standard state. At this time, the rotor magnet 14 has 12 magnetic poles which number is the double of the number of the second salient pole portions 61 of 6 portions.

Figure 12:
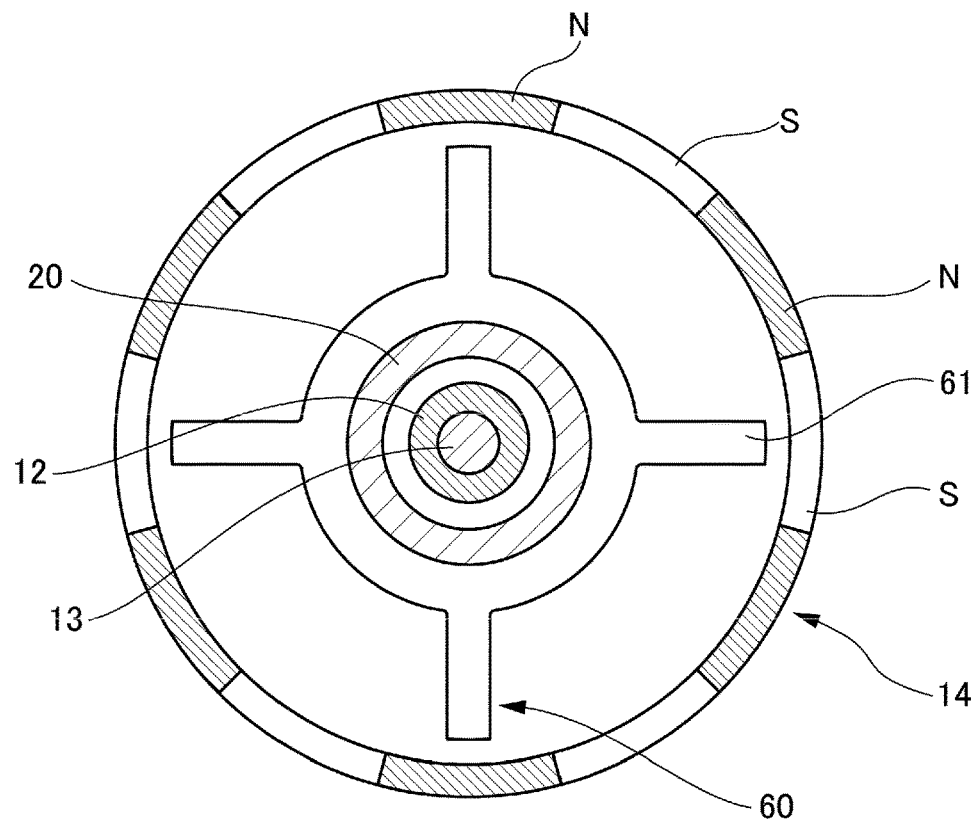
FIG. 12 is a cross-sectional view taken along line B-B of FIG. 1 and is a diagram illustrating a number of a second salient pole portion of a torque holding portion.

In the same manner, FIG. 12 illustrates a case where it is changed so as to remove one of the adjacent three portions of the second salient pole portions 61 with regard to the state of FIG. 3 as a standard state. At this time, the rotor magnet 14 has 12 magnetic poles which number is equal to three times of the number of the second salient pole portions 61 of 4 portions As described above, FIG. 11 and FIG. 12 are realized by removing some of the portions of the second salient pole portions 61, so that the torque holding portion 60 becomes to have "an arrangement similar to the first embodiment" described above, with regard to a case where the torque holding portion 60 has the same number of the portions of the second salient pole portions 61 as the number of the magnetic poles of the rotor magnet 14 (12 poles).

Also in this case, the rotor magnet 14 has magnetic poles of the number which is equal to an integral multiple of the number of the portions of the second salient pole portions 61.

Then, in the first embodiment illustrated in FIG. 3, the rotor magnet 14 has the magnetic poles of 12 poles which number is equal to the number of the portions of the second salient pole portions 61 of 12 portions. From the above description, in order to obtain an optimum arrangement of the second salient pole portions 61, the rotor magnet 14 may have the magnetic poles which number is equal to an integral multiple of the number of the portions of the second salient pole portions 61.

As described above, the present invention has been described using the embodiments, but the technical scope of the present invention is not limited to the scope described in the above embodiments. It is apparent to those skilled in the art that various alterations and improvements can be applied to the above embodiments. For example, in the third embodiment and the fourth embodiment, as the second embodiment described with reference to FIG. 4, a winding (coil) may be provided around the second salient pole portion 61 of the torque holding portion 60a. Further, the aspect of the fourth embodiment where the rotor magnet 14 is formed separately may be applied to the first embodiment and the second embodiment. Further, as described above, the torque holding portion 60, 60a may be composed of a magnetic material, and so the torque holding portion 60, 60a may be composed of a material different from the material of the stator core 51, as far as it is a magnetic material. It is apparent from the description of the appended claims that the embodiment to which such alternations or improvements are applied can be included in the technical scope of the present invention.

REFERENCE SIGNS LIST

1 . . . outer rotor type brushless motor, 10 . . . rotor portion, 11 . . . rotor frame, 12 . . . rotor boss, 13 . . . shaft, 14 . . . rotor magnet, 14a . . . second rotor magnet, 14b . . . first rotor magnet, 20 . . . bearing housing, 21 . . . bearing structure, 22 . . . washer, 30 . . . base board, 40 . . . circuit board, 50 . . . stator portion, 51 . . . stator core, 52 . . . insulation (insulator), 53 . . . winding (coil), 54 . . . first salient pole portion, 60, 60a . . . torque holding portion, 61 . . . second salient pole portion, 61a, 61b . . . tip portion, 62 . . . winding (coil)

The invention claimed is:

1. A motor, comprising:
a rotor frame;
a shaft;
first and second rotor magnets that are coupled with the rotor frame, formed separately, and spaced apart in an axial direction of the shaft;
a stator portion having a stator core, a winding around the stator core, and a plurality of first salient pole portions;
a torque holding portion facing the second rotor magnet in a radial direction, being arranged between the rotor frame and the stator portion in the axial direction of the shaft, and having a plurality of second salient pole portions; and
a circuit board arranged, in the axial direction of the shaft, on a side of the stator portion opposite the rotor frame, wherein:
an electronic component is arranged at the circuit board,
in the radial direction, the first rotor magnet faces the first salient pole portions and the second rotor magnet faces the second salient pole portions,
the first salient pole portions differ in number from poles of the first rotor magnet,
the number of the second salient pole portions is an integral multiple of the number of poles of the second rotor magnet, and
a number of the first salient pole portions is smaller than a number of the second salient pole portions,
each of the plurality of second salient pole portions has a bent tip portion, and
a circuit board faces the first rotor magnet in the axial direction of the shaft.

2. The motor according to claim 1, comprising:
a bearing housing rotatably supporting the shaft, wherein:
the stator portion is provided at an outer circumference of the bearing housing,
insulation of the stator core surrounds each of the first salient pole portions, and
the winding is around the first salient pole portions and the insulation.

3. The motor according to claim 1, comprising a winding around each of the second salient pole portions.

4. The motor according to claim 1, wherein
the stator portion and the torque holding portion are formed with different materials.

5. The motor according to claim 1, wherein
widths of the plurality of second salient pole portions are larger than widths of intervals between adjacent two second salient pole portions in a circumferential direction, and
each of the plurality of second salient pole portions faces adjacent two magnetic poles of the second rotor magnet in a radial direction.

6. The motor according to claim 1, wherein
widths of the plurality of second salient pole portions are larger than widths of intervals between adjacent two second salient pole portions in a circumferential direction, and
each of the plurality of second salient pole portions faces adjacent three magnetic poles of the second rotor magnet in a radial direction.

7. The motor according to claim 1, wherein
the second rotor magnet includes first magnetic poles and second magnetic poles in a circumferential direction, and
the plurality of second salient pole portions face the first magnetic poles of the second rotor magnet in a radial direction, and
intervals between adjacent two second salient pole portions face the second magnetic poles of the second rotor magnet in a radial direction.

8. The motor according to claim 1, wherein
the second rotor magnet includes first magnetic poles and second magnetic poles in a circumferential direction, and
two second salient pole portions of the plurality of second salient pole portions face the first magnetic poles of the second rotor magnet in a radial direction, and
other two second salient pole portions of the plurality of second salient pole portions face the second magnetic poles of the second rotor magnet in a radial direction.

9. The motor according to claim 8, wherein
the two second salient pole portions of the plurality of second salient pole portions are arranged on first opposite sides of the shaft, and
the other two second salient pole portions of the plurality of second salient pole portions are arranged on second opposite sides of the shaft.

* * * * *